United States Patent [19]

Norimatsu

[11] Patent Number: 5,307,378
[45] Date of Patent: Apr. 26, 1994

[54] DIGITAL RADIO COMMUNICATION APPARATUS

[75] Inventor: Hidehiko Norimatsu, Tokyo, Japan

[73] Assignee: NEC Corporation, Tokyo, Japan

[21] Appl. No.: 890,229

[22] Filed: May 29, 1992

[30] Foreign Application Priority Data

May 31, 1991 [JP] Japan .................................. 3-155344

[51] Int. Cl.$^5$ .............................................. H04B 1/48
[52] U.S. Cl. ...................................... 375/39; 375/53; 455/86; 455/87
[58] Field of Search .......................... 375/7, 39, 53, 85; 455/84, 86, 87; 329/306; 332/100, 103

[56] References Cited

U.S. PATENT DOCUMENTS

| | | | |
|---|---|---|---|
| 3,965,421 | 6/1976 | Bates | 455/86 |
| 4,231,116 | 10/1980 | Sekiguchi et al. | 455/87 |
| 4,373,205 | 2/1983 | Mizota | 455/86 |
| 4,627,099 | 12/1986 | Shimakata | 455/86 |
| 4,700,151 | 10/1987 | Nagata | 375/39 |

FOREIGN PATENT DOCUMENTS 0398688 5/1990 European Pat. Off.
3518896 11/1986 Fed. Rep. of Germany.

Primary Examiner—Stephen Chin
Assistant Examiner—Young Tse
Attorney, Agent, or Firm—Sughrue, Mion, Zinn, Macpeak & Seas

[57] ABSTRACT

A digital radio communication apparatus includes a reception system and a transmission system. The reception system includes a first frequency converter and a quadrature demodulator. The first frequency converter frequency-converts a reception signal and outputs the converted signal as a first IF signal. The quadrature demodulator performs quadrature demodulation of the first IF signal. The transmission system includes a quadrature modulator and a second frequency converter. The quadrature modulator performs quadrature modulation of a transmission signal and outputs the modulated signal as a second IF signal. The second frequency converter frequency-converts the second IF signal and transmits the converted signal. The frequency difference between the first and second IF signals is set to coincide with the frequency interval between a transmission frequency and a reception frequency. The frequency of one of the first and second IF signals is set to be an integer multiple of the frequency of the other IF signal.

4 Claims, 3 Drawing Sheets

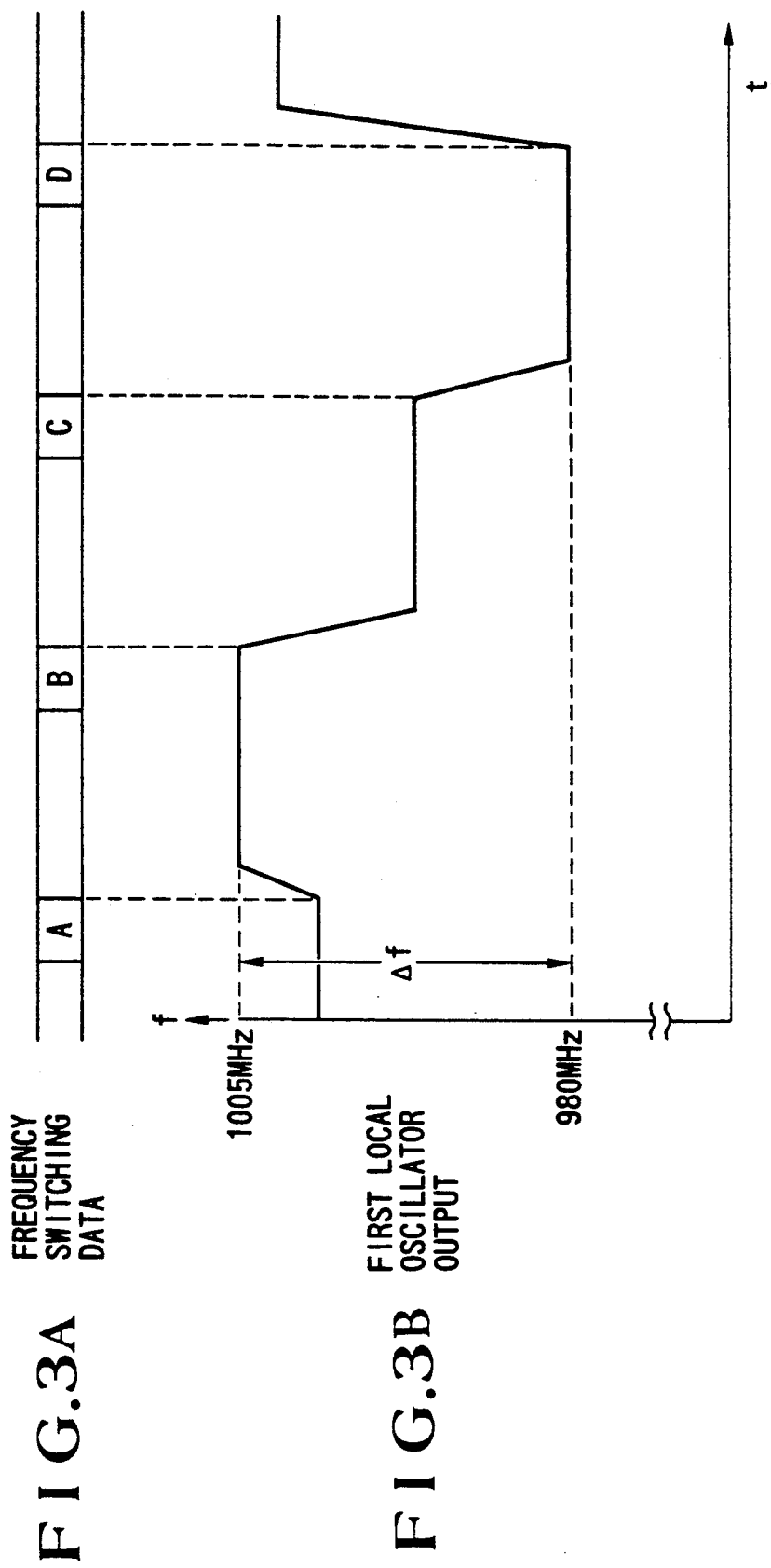

DIGITAL RADIO COMMUNICATION APPARATUS

BACKGROUND OF THE INVENTION

The present invention relates to a digital radio communication apparatus and, more particularly, to a communication apparatus such as a digital automobile telephone using a quadrature modulation scheme.

For example, a communication apparatus having the arrangement shown in FIG. 2 is used as a conventional communication apparatus. This arrangement is designed for analog mobile communication. An input signal to a transmission input terminal 31 is modulated by a modulator 27 using a direct modulation scheme. The modulated signal is output from a transmission output terminal 29. The frequency, of a signal received at a reception input terminal 28, corresponding to the frequency interval between transmission and reception frequencies is frequency-converted by a first frequency converter 21 using part of the output from the modulator 27. The resultant signal is used as a first IF signal for reception. The first IF signal is then amplified by a first IF amplifier 22 and is converted into a second IF frequency by a second IF converter 23 using a local oscillation signal from a local oscillator 26. The second IF signal is amplified by a second IF amplifier 24 and is demodulated by a demodulator 25 to obtain an output signal.

In this arrangement, since part of the output from the modulator 27 is used to obtain the first IF signal, an oscillator for generating a local oscillation signal for obtaining the first IF signal is not required.

If a communication apparatus having such an arrangement is applied to a digital radio communication apparatus, the apparatus requires a device capable of directly performing quadrature modulation by using a transmission frequency. An automobile telephone terminal unit requires an inexpensive device which can be operated with low current consumption and demands no adjustment. However, a quadrature modulator which can perform direct modulation and satisfy these requirements is not currently available. Under the circumstances, such a communication apparatus requires a means for performing quadrature modulation at a low frequency and frequency-converting the resultant frequency into a transmission frequency. If, however, an intermediate frequency on the transmission side is simply set regardless of a frequency on the reception side, since the transmission and reception sides have no correlation, a total of four local oscillators, i.e., local oscillators for obtaining IF signals and local oscillators for performing quadrature modulation and demodulation, are required for the transmission and reception sides, respectively, resulting in complication in the circuit arrangement.

SUMMARY OF THE INVENTION

It is an object of the present invention to provide a digital radio communication apparatus whose circuit arrangement is simplified by decreasing the number of local oscillators.

In order to achieve the above object, according to the present invention, there is provided a digital radio communication apparatus comprising a reception system including a first frequency converter for frequency-converting a reception signal and outputting the converted signal as a first IF signal, and a quadrature demodulator for performing quadrature demodulation of the first IF signal, and a transmission system including a quadrature modulator for performing quadrature modulation of a transmission signal and outputting the modulated signal as a second IF signal, and a second frequency converter for frequency-converting the second IF signal and transmitting the converted signal, wherein a frequency difference between the first and second IF signals is set to coincide with a frequency interval between a transmission frequency and a reception frequency, and a frequency of one of the first and second IF signals is set to be an integer multiple of a frequency of the other IF signal.

BRIEF DESCRIPTION OF THE DRAWINGS

FIG. 3A is a timing chart showing frequency switching data; and

FIG. 3B is a timing chart showing a change in frequency of a local oscillation signal.

DESCRIPTION OF THE PREFERRED EMBODIMENT

Figure 1:
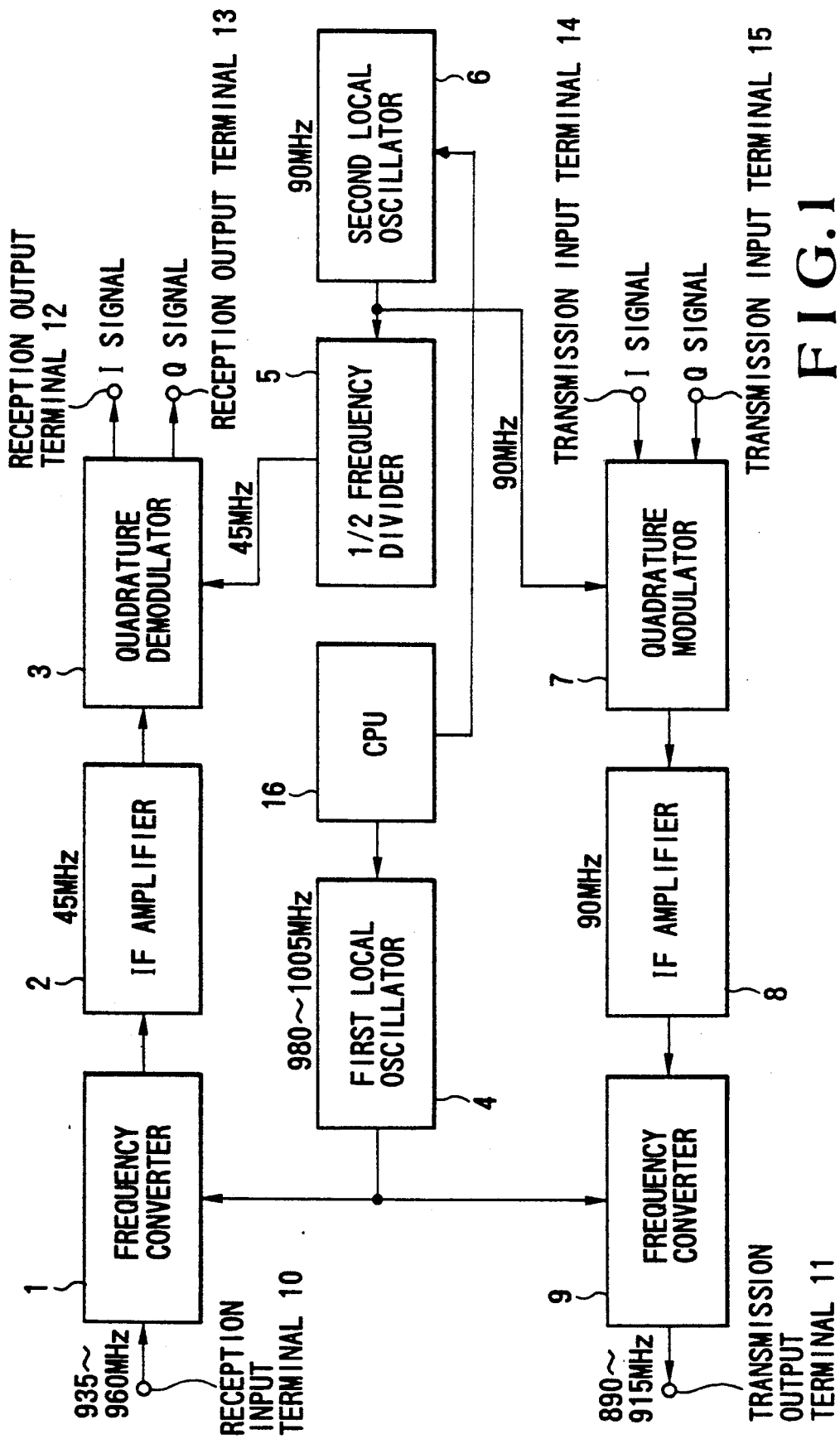
FIG. 1 is a block diagram showing a digital radio communication apparatus according to an embodiment of the present invention.
Figure 2:
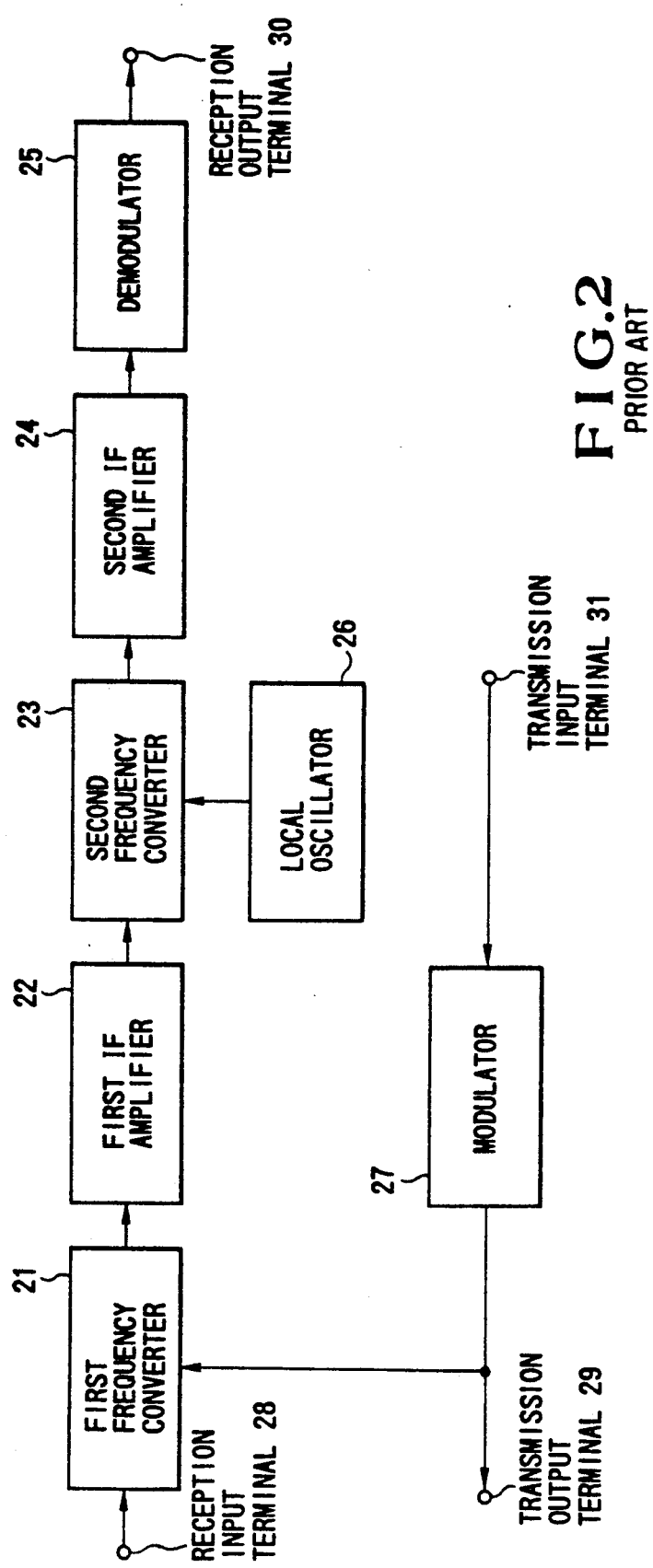
FIG. 2 is a block diagram showing a conventional analog radio communication apparatus.

The present invention will be described below with reference to the accompanying drawings. FIG. 1 shows an embodiment of the present invention. A signal received at a reception input terminal 10 is frequency-converted by a frequency converter 1 using a local oscillation signal from a first local oscillator 4. The resultant signal is amplified by an IF amplifier 2. Thereafter, the signal is demodulated by a quadrature demodulator 3 using signals obtained by ½-dividing a local oscillation signal from a second local oscillator 6 through a frequency divider 5. The resultant signals are output, as the Q and I signals, from reception output terminals 12 and 13, respectively. The I and Q signals are respectively input to transmission input terminals 14 and 15. Quadrature modulation of the I and Q signals is performed by a quadrature modulator 7 using the local oscillation signal from the second local oscillator 6. The modulated signal is amplified by an IF amplifier 8 and is frequency-converted by a frequency converter 9 using the local oscillation signal from the first local oscillator 4. The resultant signal is then sent from a transmission output terminal 11. A CPU 16 outputs frequency switching data to the first local oscillator 4 and switches/controls its output frequency within a predetermined range.

In this case, the oscillation frequency of the first local oscillator 4 is set to be 980 to 1,005 MHz, and the oscillation frequency of the second local oscillator 6 is set to be 90 MHz on the basis of the GSM scheme in which the reception frequency is 935 to 960 MHz; the transmission frequency, 890 to 915 MHz; and the transmission/reception channel interval, 45 MHz. That is, the difference between the frequencies of IF signals on the reception and transmission sides is set to coincide with the transmission/reception channel interval of 45 MHz. In addition, the frequency of the transmission-side IF signal is set to be an integer multiple of the frequency of the reception-side IF signal. In this case, the frequency of the former signal is set to be twice that of the latter signal, which corresponds to the frequency division count of the frequency divider 5.

With this arrangement, therefore, by using the local oscillation signal output from the first local oscillator 4 and having a frequency of 980 to 1,005 MHz, a reception signal having a reception frequency of 935 to 960 MHz can be converted into a 45-MHz IF frequency, and at the same time a 90-MHz transmission-side IF signal can be converted into a signal having a transmission frequency of 890 to 915 MHz. On the other hand, quadrature demodulation of a 45-MHz reception-side IF signal can be performed by using a 45-MHz local oscillation signal obtained by ½-dividing the 90-MHz local oscillation signal from the second local oscillator 6 through the frequency divider 5. In addition, quadrature modulation of the 90-MHz transmission-side IF signal can be performed by using this 90-MHz local oscillation signal.

With this operation, transmission and reception signals having desired frequencies can be obtained by using the two local oscillators, i.e., the first and second local oscillators 4 and 6, and hence the circuit arrangement can be simplified.

Note that the relationship between the frequencies of the transmission- and reception-side IF signals may be reversed.

FIG. 3A shows frequency switching data output from the CPU 16 to the first local oscillator 4 capable of switching frequencies. Referring to FIG. 3A, frequency switching data A and C respectively correspond to a maximum output frequency of 1,005 MHz and a minimum output frequency of 980 MHz in the output frequency range of the first local oscillator 4, and frequency switching data B and D respectively correspond to predetermined output frequencies in the output frequency range.

FIG. 3B shows a change in frequency of the local oscillation signal output from the first local oscillator 4. As shown in FIG. 3B, the output frequencies of the first local oscillator 4 are switched from a maximum frequency of 1,005 MHz to a minimum frequency of 980 MHz in accordance with the frequency switching data A to D from the CPU 16. This frequency range is set on the basis of the reception and transmission bands and the respective IF signals. Similar to the transmission and reception band widths, a frequency switching width Δf is set to be 25 MHz.

As has been described above according to the present invention, the frequency difference between the IF signals on the reception and transmission sides is set to coincide with the frequency interval between the transmission and reception frequencies, and the frequency of one of the reception- and transmission-side IF signals is set to be an integer multiple of the frequency of the other IF signal. Therefore, the quadrature modulator and the frequency converter on the transmission side and the quadrature demodulator and the frequency converter on the reception side can be operated by using the two local oscillators. That is, a decrease in number of local oscillators can be achieved to simplify the circuit arrangement.

What is claimed is:

1. A digital radio communication apparatus comprising:
    a reception system including a first frequency converter for frequency-converting a reception signal having a predetermined reception frequency and outputting the converted signal as a first IF signal, and a quadrature demodulator for performing quadrature demodulation of the first IF signal; and
    a transmission system including a quadrature modulator for performing quadrature modulation of a transmission signal having a predetermined transmission frequency and outputting the modulated signal as second IF signal, and a second frequency converter for frequency-converting the second IF signal and transmitting the converted signal,
    wherein a frequency difference between the first and second IF signals is set to coincide with a frequency interval between the predetermined transmission frequency and the predetermined reception frequency, and frequency of one of the first and second IF signals is set to be an integer multiple of a frequency of the other IF signal.

2. An apparatus according to claim 1, further comprising a first local oscillator for outputting a first local oscillation signal to said first and second frequency converts to frequency-convert the reception signal and the transmission signal, a second local oscillator for outputting a second local oscillation signal to one of said quadrature demodulator and said quadrature modulator to perform the quadrature modulation/demodulation, and a frequency divider for frequency-dividing the second local oscillation signal and outputting the divided outputs to the other of said quadrature demodulator and said quadrature modulator to perform the quadrature modulation/demodulation.

3. An apparatus according to claim 2, further comprising a control means for controlling said first local oscillator to switch frequencies of the first local oscillation signal in accordance with reception and transmission bands in which the predetermined reception and predetermined transmission frequencies are respectively changeable, and wherein a frequency switching range of the first local oscillation signal is set on the basis of the reception and transmission bands and the first and second IF signals.

4. An apparatus according to claim 2, wherein the divider ratio of said frequency divider is the inverse of said integer multiple.

* * * * *